US00RE34204E

United States Patent [19]

Takada

[11] E Patent Number: Re. 34,204

[45] Reissued Date of Patent: Mar. 30, 1993

[54] PRESSURE REGULATION DEVICE FOR VEHICLE SAFETY AIR BAG

[76] Inventor: Juichiro Takada, 3-12-1, Shin-machi, Setagaya-ku Tokyo, Japan

[21] Appl. No.: 658,760

[22] Filed: Feb. 20, 1991

Related U.S. Patent Documents

Reissue of:

[64] Patent No.: 4,805,930
Issued: Feb. 21, 1989
Appl. No.: 89,581
Filed: Aug. 26, 1987

[30] Foreign Application Priority Data

Aug. 26, 1986 [JP] Japan ..... 61-128870[U]

[51] Int. Cl.[5] ..... B61R 21/16; B61R 21/28
[52] U.S. Cl. ..... 280/739; 280/728
[58] Field of Search ..... 280/728, 729, 731, 732, 280/735, 737, 738, 739, 740, 743

[56] References Cited

U.S. PATENT DOCUMENTS

| | | | |
|---|---|---|---|
| 3,527,475 | 9/1970 | Carey et al. | 280/739 |
| 3,573,885 | 4/1971 | Brawn | 280/739 |
| 3,600,003 | 8/1971 | Carey | 280/729 |
| 3,887,213 | 6/1975 | Goetz | 280/738 |
| 3,892,425 | 7/1975 | Sakairi et al. | 280/743 |
| 3,900,210 | 8/1975 | Lohr et al. | 280/729 |
| 3,907,327 | 9/1975 | Pech | 280/729 |
| 4,097,065 | 1/1978 | Okada et al. | 280/739 |
| 4,213,634 | 7/1980 | Hoshino et al. | 280/728 |

*Primary Examiner*—Kenneth R. Rice
*Attorney, Agent, or Firm*—Brumbaugh, Graves, Donohue & Raymond

[57] ABSTRACT

Stitched thread seams between fabric elements of the envelope of a vehicle safety air bag induce localized distension and opening up of the envelope fabrics along the seams, thereby causing the film coatings of the envelope fabric to rupture along the seam and allow gas to escape and maintain a substantially constant overall maximum pressure, regardless of variations in ambient temperature.

6 Claims, 2 Drawing Sheets

PRESSURE REGULATION DEVICE FOR VEHICLE SAFETY AIR BAG

Matter enclosed in heavy brackets [ ] appears in the original patent but forms no part of this reissue specification; matter printed in italics indicates the additions made by reissue.

BACKGROUND OF THE INVENTION

The present invention relates to a pressure regulation device for a vehicle safety air bag which is provided to protect a passenger of a car or other vehicle from a secondary collision. In an air bag of this type a bulbous-shaped envelope is folded and stored at the center of the steering wheel and is rapidly inflated by a gas generated virtually instantaneously by an inflator at the moment of a collision in order to prevent the driver, who is thrown forward by inertial force, from hitting the steering wheel directly, to absorb and damp the energy imposed on the driver by the inertial force, and to spread the load of the impact over the driver's torso.

The maximum internal pressure of the air bag main envelope is typically 1.0 kg/cm$^2$ when it is inflated, and its normal pressure is 0.7 kg/cm$^2$. Therefore, the air bag envelope must be fabricated so as to withstand these pressures, but if the pressure is too high, a high repelling or rebound force will develop and will propel the driver back away from the air bag, thereby possibly causing whiplash injury to the driver. It is known, therefore, to provide a pressure-relief device in order to keep the internal pressure from exceeding a predetermined level. One such device is simply a vent orifice that allows gas to escape when the driver strikes the inflated envelope and the internal pressure rises.

In particular, the conventional pressure-relief vent hole structures are of the type wherein a normally-open vent hole is disposed in the envelope and of the type wherein a film of a synthetic resin or the like is disposed in the vent hole so that the film is broken by a gas pressure above a predetermined pressure. In the case of the open vent hole, if the size of the hole is determined based on a low external or ambient temperature, the gas pressure will become excessive when the temperature is high, and if the size of the hole is determined based on a high ambient pressure, the gas pressure will be insufficient when the temperature is low. In the case of vent holes with a rupturable film, when the film is broken at pressures above a predetermined level, the fragments of the film scatter. Therefore, the open area of the vent hole remains substantially the same irrespective of the gas pressure, and the gas pressure, which varies with the ambient temperature, cannot be regulated. Thus, there is in both types of vent devices variation in the damping property when the driver hits the bag, as a function of ambient temperature.

SUMMARY OF THE INVENTION

An object of the present invention is to provide an improved pressure relief device for vehicle safety air bags and, in particular, to provide a pressure relief device in which the sizes of openings in the envelope for release of gas increase, the greater the internal gas pressure.

In accordance with the present invention, the air bag envelope, which is made of a conventional coated fabric, comprises first and second portions disposed in overlapping relation along their respective margins and a stitched thread seam along the overlapping margins that is adapted to open up to a degree that varies in accordance with the level of gas pressure in the envelope and to allow gas to escape along the opened-up seam.

For a better understanding of the invention reference may be made to the following description of exemplary embodiments, taken in conjunction with the accompanying drawings.

DESCRIPTION OF THE EMBODIMENTS

Figure 1:
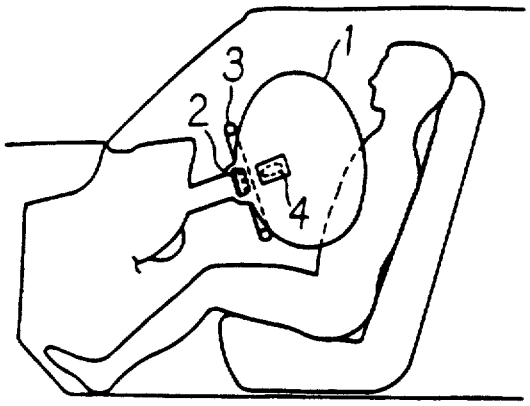
FIG. 1 is a schematic elevational view of a typical air bag installation in which the present invention is useful.

In FIG. 1 reference numeral 1 designates a bulbous air bag main envelope and reference numeral 2 an inflator which is fitted to an opening of the envelope and consists of an instantaneous gas generator. The air bag envelope 1 is folded and stored in a storage receptacle built into the center of a steering wheel 3. When the car undergoes a collision, the inflator 2 is operated by a sensor (not shown), releases a pressurized gas into the air bag envelope 1 and inflates it.

Figure 2:
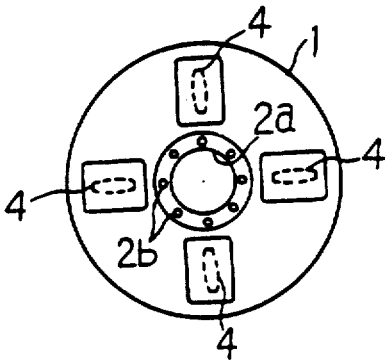
FIG. 2 is a plan view of a first embodiment of the invention, the view being of the aspect that faces away from the driver.

Stitched thread seams 4 for regulating the gas pressure are disposed on the air bag envelope 1 on the steering wheel side (the aspect facing the steering wheel), as shown in FIG. 1 and these seams 4 are arranged equidistantly around the opening 2a of the air bag main body 1 as shown in FIG. 2. Reference numeral 2b represents holes for fasteners that secure the air bag to the steering wheel.

Figure 3A:
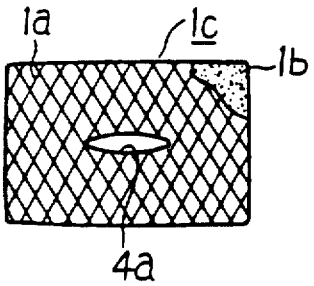
FIG. 3A is a plan view of a portion of the main envelope of the first embodiment.
Figure 3B:
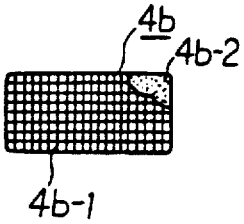
FIG. 3B is a plan view of a patch that forms a second portion of the envelope.
Figure 3C:
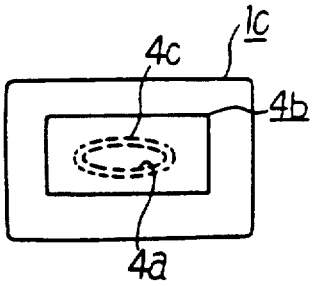
FIG. 3C is a plan view of the assembly of the first embodiment.

Each pressure-regulation seam 4 is constituted in the following way. As shown in FIG. 3A, the air bag envelope consists of a cloth 1c produced by disposing a lining film 1b of a polymeric material, such as silicone rubber, on the inner surface of a woven fabric 1a. For each pressure relief seam 4 an oblong vent hole 4a is formed on this bag cloth 1c with the longer dimension placed along the bias of the threads of the fabric 1c. A patch is applied over the vent hole 4a, as shown in FIG. 3B. The margin of the patch 4b overlaps the margin of the envelope around the hole 4a.

The patch 4b is produced by disposing a resin coat film 4b-2 of silicone resin, rubber, or the like on a plain woven fabric 4b-1. The patch 4b is applied to the envelope 1c in such a manner as to cover the vent hole 4a and is stitched by sewing threads along the margin of the hole. The remaining outer portion of the patch 4b outwardly of the seam 4c is bonded to the envelope cloth by an adhesive.

Figure 4A:
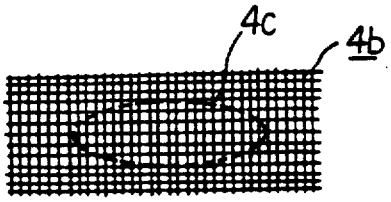
FIG. 4A is a diagrammatic view of the first embodiment in which the pressure-relief seam is intact.
Figure 4B:
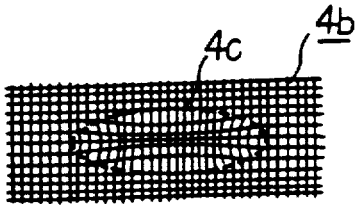
FIG. 4B is a diagrammatic view in which the seam has opened up.

When the gas pressure in the inflated envelope is below a certain pressure, the patch 4b remains substantially intact, the state shown in FIG. 4A, even if it expands. When the gas pressure exceeds the predetermined pressure, shearing stress develops between the sewing threads 4c and the patch 4b, which is distended by the gas pressure as shown in FIG. 4B, so that deviation of threads, that is, opening of the cloth, occurs in the patch cloth 4b. The resin coat film 4b-2 is broken and the gas leaks out through the ruptures in the film. The opening up of the cloth becomes greater with a higher gas pressure, and the greater area of the openings allows greater rates of gas leakage.

The overall operation of the embodiment is as follows. When the car impinges accidentally against anything, the sensor senses the collision, and the inflator 2 generates and supplies the gas into the folded air bag envelope 1 through its opening 2a, thereby inflating the air bag envelope 1. Assuming that the ambient temperature is low, such as in winter, for example, the pressure of the generated gas is relatively low, for example, below 0.7 kg/cm$^2$. Then, the patch 4b of the pressure regulation seam portion 4 remains intact (FIG. 4A) and, hence, the gas does not leak. When the external temperature is high, such as in summer, however, the pressure of the gas becomes relatively greater, and if it is above 0.7 kg/cm$^2$, for example, the patch 4b is deformed and opened up by the gas pressure, and the resin coat film 4b-2 is ruptured. The degree of deformation and opening up of the cloth increases with an increasing gas pressure so that the quantity of the leaking gas becomes greater and the inner pressure can be kept constant. In this manner, the inner pressure can be regulated to a predetermined level, even when the generated gas pressure is high, and if the driver hits the bag under this state, the energy can be absorbed and the driver is not repelled back.

Figure 5A:
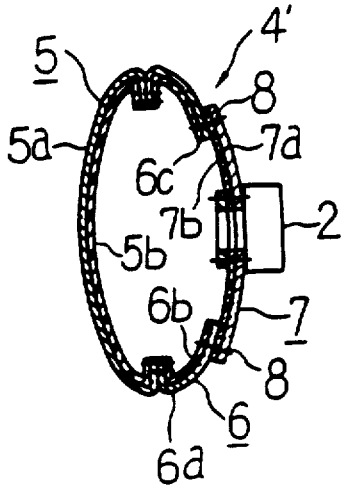
FIG. 5A is a side cross-sectional view of a second embodiment.
Figure 5B:
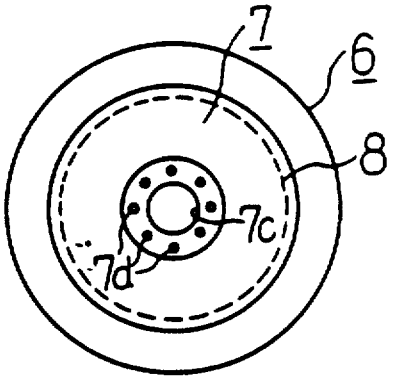
FIG. 5B is a plan view of the aspect of the envelope of the second embodiment that faces away from the driver.

Though the embodiment described above illustrates the case where vent holes are made in small regions of the envelope fabric, it is also possible to employ the structure shown in FIGS. 5 and 6. A cloth piece 5 having a resin coat film 4b on a plain woven fabric 5a and a cloth piece 6 having a resin coat film 6b on a plain woven fabric 6a are sewn together to form a portion of a bulbous envelope. The piece 6 has an opening 6c, and a cloth 7 piece having a resin coat film 6b on a plain woven fabric 7a is sewn by a thread to form a seam 4' along the respective overlapping margins of the pieces 6 and 7. An opening 7c is formed at the center of the piece 7, and bolts are inserted into bolt holes 7d around the periphery of the opening 7c so that the inflator 2 can be fitted, as shown in FIG. 4(a).

Figure 6A:
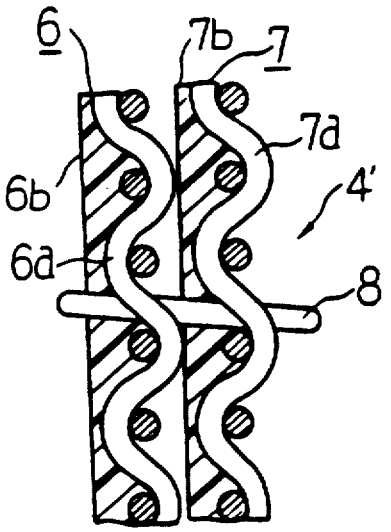
FIG. 6A is a fragmentary cross-section of a seam that is intact.
Figure 6B:
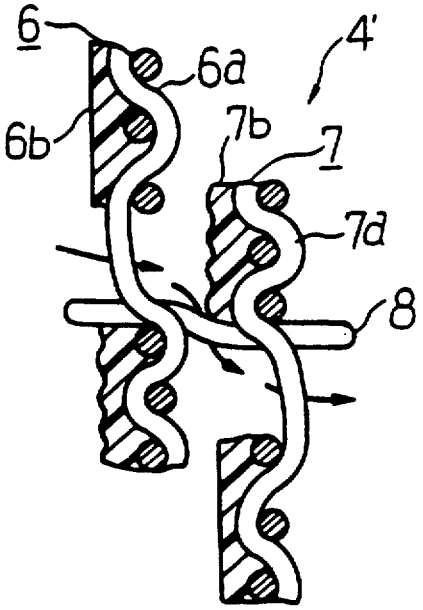
FIG. 6B is a detail cross-section of a seam that has opened up for pressure relief.

In this construction when the inflator 2 generates the gas and the envelope inflates, the seam 4' under the intact state where the gas pressure is low and the gas does not leak, as shown in FIG. 6A, changes when the gas pressure is high to the state where shearing stress develops between the piece 6 and the piece 7 due to the high gas pressure, as shown in FIG. 6B, so that the threads oriented at right angles to the stretching direction of the respective fabrics 6a and 7a on one side, with the stitching threads 8 being the boundary, are pushed while the [treads] *threads* on the other side are stretched and the resin coat films 6b and 7b are broken. This breakage occurs on the mutually opposite sides of the pieces 6 and 7, and the gas leaks through the open fabrics on the stretched sides, thereby keeping the gas pressure constant.

In summary, as described above, in accordance with the present invention, the stitched thread seams between portions of the envelope cause the fabrics to open up and the coatings to break to degrees that are variable in accordance with the gas pressure above a predetermined gas pressure. The intrusion of the threads of the stitched seams between threads of the fabrics in the overlapping margins of portions of the envelope inhibits normal stretching of the fabrics and creates localized high stresses, which is what causes the fabrics to distend and open up along the seams and produces ruptures in the film coatings. The greater the internal gas pressure, the greater the stresses and the consequent ruptures of the film. Accordingly, gas is released in increasing amounts, the greater the pressure, and the overall gas pressure can be kept constant. Therefore, even though ambient temperature changes, such as in summer and winter, cause the generated gas pressure of the inflator to change, the gas leakage is reduced when the generated gas pressure is low, thereby to prevent the drop of the internal pressure, and is increased when the generated gas pressure is high, thereby to prevent the inner pressure from being excessive. In this manner, the performance of the air bag in protecting the driver can be kept at a sufficient level, irrespective of differences in the ambient temperatures.

In the conventional pressure regulators of air bags, wherein a resin film is disposed on the vent hole, the film is broken substantially uniformly if the pressure is above a predetermined pressure, and the gas is often released from the envelope unnecessarily. In comparison with the conventional devices of this type, the present device can utilize the gas pressure more efficiently, so that the inflator can be made more compact, and a great advantage can be obtained in connection with the amount of space required for the inflator.

I claim:

1. In a vehicle safety air bag having an inflatable envelope of fabric coated with a polymeric film to make it gas tight and pressure-relief means associated with the envelope for enabling gas to escape from the envelope when the gas pressure exceeds a predetermined level, the improvement wherein the pressure relief means comprises first and second fabric elements of the envelope disposed in overlapping relation along their respective margins and a stitched thread seam along said overlapping margins adapted to induce opening up of the fabric elements and rupture of the films thereof along the seam to degrees that vary in accordance with the level of gas pressure in the envelope above said predetermined level and to allow gas to escape along the opened up seam.

2. The improvement claimed in claim 1 wherein said one element of the envelope is a main body having a hole and the second element is a patch covering the hole.

3. The improvement claimed in claim 1 wherein the first element is a major part of the envelope that includes its perimeter and the second element is a minor part within the perimeter, whereby the seam is subject to shear stresses due to gas pressure.

4. The improvement claimed in claim 1 wherein the first and second elements are also adhesively joined along said margins.

*5. In a vehicle safety air bag having an envelope of fabric coated with a polymeric film to make it gas tight and inflatable by pressurized gas from an inflator, the improvement wherein the envelope includes at least one fabric element consisting of a woven fabric and a lining film coating of silicone rubber on the inner surface of the woven fabric.*

*6. The improvement according to claim 5 wherein all fabric elements of the envelope consist of a woven fabric and a lining film coating of silicone rubber on the inner surface of the woven fabric.*

* * * * *